United States Patent [19]
Kai et al.

[11] Patent Number: 4,919,272
[45] Date of Patent: Apr. 24, 1990

[54] EASILY OPENABLE TIGHTLY SEALED BAG

[75] Inventors: Hisao Kai, Chiba; Kiyoshi Nakashima, Ageo, both of Japan

[73] Assignee: Asahi Chemical Polyflex, Osaka, Japan

[21] Appl. No.: 256,220

[22] Filed: Oct. 12, 1988

Related U.S. Application Data

[63] Continuation of Ser. No. 803,446, Dec. 2, 1985, abandoned.

[30] Foreign Application Priority Data

Dec. 3, 1984 [JP] Japan ............................. 59-254207
Dec. 14, 1984 [JP] Japan ............................. 59-262951
Aug. 20, 1985 [JP] Japan ............................. 60-180930

[51] Int. Cl.$^5$ ............................................. B65D 5/59
[52] U.S. Cl. ............................. 206/620; 260/484; 260/610; 260/629; 260/632; 383/109
[58] Field of Search ............... 206/484, 484.1, 484.2, 206/601, 604, 610, 620, 626, 629, 632; 383/100, 101, 103, 109; 428/43

[56] References Cited

U.S. PATENT DOCUMENTS

| | | | |
|---|---|---|---|
| 2,697,832 | 12/1954 | Stich | 383/103 X |
| 3,097,787 | 7/1963 | Schur | 383/103 X |
| 3,399,760 | 9/1968 | Hechler, IV | 206/620 |
| 3,628,720 | 12/1971 | Lengerich | 383/103 X |
| 3,642,126 | 2/1972 | Kurtz et al. | 206/604 X |
| 3,768,725 | 10/1973 | Pilaro | 206/604 |
| 3,986,640 | 10/1976 | Redmond | 206/620 X |
| 4,136,776 | 1/1979 | Poncy | 206/484 X aaa |
| 4,139,643 | 2/1979 | Hix et al. | 206/620 X |
| 4,150,184 | 4/1979 | Tesch | 428/43 |
| 4,170,305 | 10/1979 | Hull, Jr. et al. | 206/611 X |
| 4,539,793 | 9/1985 | Malek | 206/620 X |
| 4,567,986 | 2/1986 | Eastwood | 206/484 X |
| 4,634,006 | 1/1987 | Yanase | 383/109 X |

*Primary Examiner*—Bryon P. Gehman
*Attorney, Agent, or Firm*—Armstrong, Nikaido, Marmelstein, Kubovcik & Murray

[57] ABSTRACT

This invention provides an easily openable tightly sealed plastic bag which is formed of a film containing at least a substrate layer and a heat seal layer and is possessed of a sealed part whose substrate layer contains a multiplicity of through cuts, these cuts being formed substantially on the edge lines and partly or wholly closed with the heat seal layer. This tightly sealed bag safely retains the practical strength normally expected of any bag and avoids accidentally sustaining rupture while the bag is being transported or handled and yet permits itself to be opened with the force of finger tips. This invention manifests its utility particularly in a tightly sealed bag which is formed of a substrate of high strength and high barrier property. This invention further provides a method suitable for the production of the tightly sealed bag described above and a device to be used in working the method. The easily openable tightly sealed plastic bag of particularly desirable quality can be obtained by the method and the device so provided by this invention.

9 Claims, 13 Drawing Sheets

FIG. 1
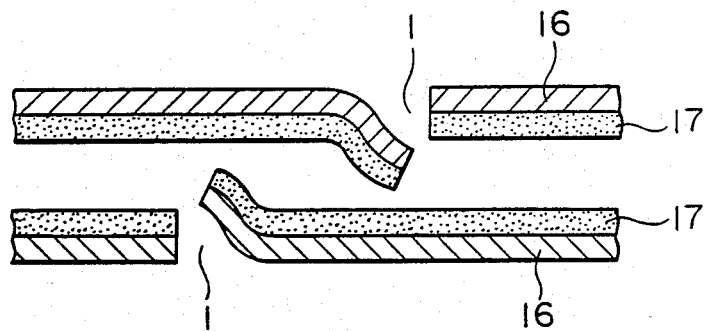
FIG. 2(a)
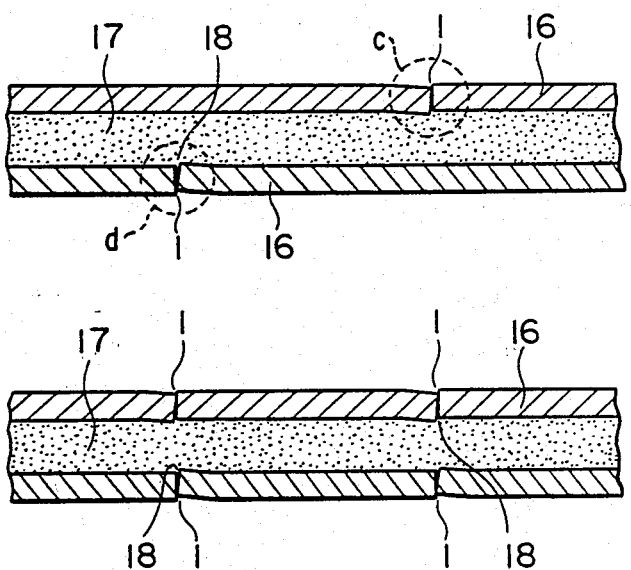
FIG. 2(b)

EASILY OPENABLE TIGHTLY SEALED BAG

This application is a continuation of application Ser. No. 803,446 filed Dec. 2, 1985.

BACKGROUND OF THE INVENTION

1. Field of the Invention:

This invention relates to an easily openable tightly sealed plastic bag so fabricated that it can safely retain the practical strength normally expected of any bag, avoid accidentally sustaining rupture while the bag is being transported or handled, and be opened with the force of finger tips, to a method for the production thereof, and to a tool to be used in working the method.

2. Description of the Prior Art:

Plastic films and laminated films made of superposed layers of plastics, aluminum foil or other metals, paper, and other materials are light in weight, excel in airtightness, and possess high strength and ease of handling. Bags made of such films can be tightly sealed simply by heat-sealing without particularly requiring use of any adhesive agent. Owing to these merits, the films have been recently used extensively to produce tightly sealed bags for various commodities such as foodstuffs, pharmaceutical products, and sundries which come in various forms such as liquid, powder, paste, and solid.

In such a tightly sealed bag as described above, the strong point owned by the material of the bag ironically offers resistance to tearing and renders the bag hardly openable. Generally, the film for use in the tightly sealed bag is tough but, once a cut is inflicted in the bag, is liable to propagate the cut. When one point somewhere in the edge of the bag is cut in advance, therefore, the bag can be opened by the force of finger tips applied so as to widen the cut.

The method of forming an I notch of not less than 2 mm in length in the transverse direction in advance somewhere in the heat-sealed edge of a bag of such a film has been already employed. This method, however, has a disadvantage that the notch so formed in the edge of the bag can not be found readily. The method of forming a V notch somewhere in the edge of a bag of such a film is also used. In accordance with this method, it is somewhat easy to find the notch formed in the bag. When this method is employed where a large number of bags are produced and packed, there is a possibility that V-shaped film scraps resulting from the insertion of V notches will scatter, adhere to the packed products, and deteriorate the factory environment. U.S. Pat. No. 3,650,461 discloses an invention which forms a circular through hole in a sealed portion of a bag. This method also gives rise to a circular scrap and entails a problem similar to the problem suffered by the aforementioned method of inserting a V notch. Moreover, the bag bearing the circular through hole has a problem that desired tearing of the bag necessitates considerably large force because of the force of finger tips applied in an effort to start a tear in the bag results in concentration of stress around the boundary of the circular through hole and consequent elongation of the bag around the circular through hole.

In any of the methods described above, since the point for starting a tear in the bag is formed at a specific location, it does not always turn out to be an advantageous location. There is a possibility that a tear will propagate in an unexpected direction and induce unexpected spilling of the contents. In the case of the method of inserting an I notch or a V notch, since the notch is generally large (at least 2 mm in length), the notch inserted in the film before its fabrication into a bag renders the film readily tearable and even prevents the film from being effectively fabricated into a bag.

Japanese Utility Model Publication No. 22,484/1979 discloses a bag of plastic film having, as points for starting a tear in the bag, a plurality of small punched holes, small embossed holes, or small slits of successively decreasing sizes arranged inwardly from the edge of the bag in at least one of the sealed sides of the bag. Of the bags proposed by this Publication No. 22,484/1979, those provided with small punched holes and small slits have a disadvantage that once tears start in these bags, they rapidly propagage along the rows of holes or slits which are provided to start a tear, and the tears so growing induce fracture of bags to spill their contents while the bags are being transported or handled. The bag provided with embossed holes have a disadvantage that since the holes are merely depressed and are not perforated, they do not easily start tears in the bag unless they are exposed to fairly great force.

Japanese patent application Laid-open No. 160251/1983 discloses a tightly sealed dispensing bag possessing at least three heat-sealed edges and having a multiplicity of scratches closely formed in edge portions of the bag substantially perpendicularly to the edges. The scratches in this bag are formed as by rubbing with a grindstone and the like. This dispensing bag, therefore, has a disadvantage that the scratched surface caused by the rubbing is conspicuous and impairs its external appearance. There is also a possibility that the scratches are liable to be irregular and uneven in size and direction, causing the bag to be opened with difficulty, and the direction of tearing is not uniform.

Besides the various problems described above, the conventional bags have a disadvantage that they are openable only partially depending on how the bags are formed. For example, in the case of the so-called pillow type bag having a notch and a sealed portion formed in the longitudinal direction at the center and the sealed portion produced by overlapping and heat-sealing the opposed ends of the film without allowing the heat-sealed ends to protrude from the boundary of the bag as illustrated in FIG. 20 and FIG. 21, a tear started from the notch 7 ceases to propagate after reaching the heat-sealed portion, leaving the bag only half opened. In this case, it causes inconvenience that the content of the bag has to be drawn out through the small opening barely formed as described above. Where the content is in a solid shape, it is particularly hard to pull out of the bag. It also causes a disadvantage that since the bag is hardly opened it is quite difficult to take out its contents when the width of the contents such as of a medically used articles is very close to that of the bag.

SUMMARY OF THE INVENTION

This invention has been established with a view to overcoming the drawbacks suffered by the conventional plastic bags. It is aimed at providing a tightly sealed bag containing ideal cuts or small slits. This bag is free from forming any cut scraps of the film in the course of its production, allows no mingling of foreign matters into its interior, and retains the practical strength. And it can be torn with the force of finger tips at any desired position in the edge portions to open the bag enough to permit easy removal of the contents. The invention provides also a method for the production of the tightly sealed bag, and a tool to be used in working the method for production of the bag.

To be specific, this invention in its first aspect concerns an easily openable tightly sealed plastic bag formed of a film containing at least a substrate layer and a heat seal layer and possessed of a sealed part, which bag is characterized by the sealed part containing in the substrate layer of multiplicity of through cuts and the through cuts being substantially formed in the edge portion of the bag and partly or wholly closed with the heat seal layer.

This invention in its second aspect concerns a method for the production of an easily openable tightly sealed plastic bag, characterized by forming a multiplicity of through cuts in a film containing at least a substrate layer and a heat seal layer, then folding the film thereby enabling the edge portions containing said through cuts to constitute partly or wholly the sealed edge portions of a bag, and heat-sealing the superposed edges or inner sides thereof thereby completing a tightly sealed bag having at least three edges thereof heat-sealed.

This invention in its third aspect concerns a method for the production of an easily openable tightly sealed bag, characterized by forming a multiplicity of through cuts in a substrate film, binding a heat seal film on one side of the substrate film, then folding the bound films thereby enabling the bordering portions containing said through cuts to constitute partly or wholly the sealed edge portions of a bag, and heat-sealing the superposed edges or inner sides thereof thereby completing a tightly sealed bag.

This invention in its fourth aspect concerns a slit imparting tool having blades of fine protrusions linearly aggregated thereon, which tool is characterized by said fine protrusions individually possessing a ridge and said ridge partly or wholly constituting a cutting edge.

BRIEF DESCRIPTION OF THE DRAWINGS

FIG. 1 is an end view illustrating a section of the through slits formed in a film prior to heat-sealing with the tool shown in FIG. 11 [corresponding to a view taken on line X—X of FIG. 3(b)]. FIG. 2(a) and (b) are cross-sections illustrating the heat-sealed portion of folded films.

DETAILED DESCRIPTION OF THE PREFERRED EMBODIMENTS

Figure 2C:
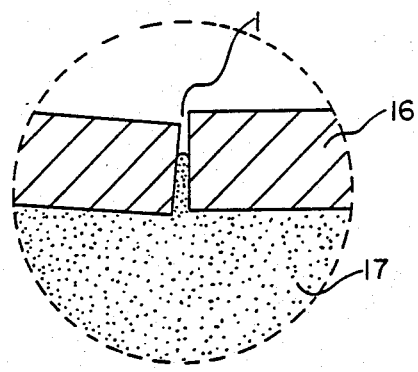
FIG. 2(c) is an enlarged view of the portion of the film within circle (c) in FIG. 2(a) and illustrates a through cut partially filled by the heat seal layer material.

The substrate layer in the film of which the tightly sealed bag of this invention is produced is formed of a material required to withstand the heat used for heat sealing of the portions of the film for forming a sealed part and possesses strength enough to withstand impacts normally exerted during the course of fabrication such as printing, laminating, packing, transportation, and storage. Examples of the material fulfilling the requirement include polyamide (nylon), polyester, biaxially oriented polypropylene, cellophane, cellulose acetate, and rigid PVC resin. The substrate layer of such a material is so tough that it is hard to start a tear in the film with the force of finger tips. Generally, prior to its use in the production of a bag, the substrate layer of this nature has a heat sealable plastic film, i.e. a heat seal layer, superposed fast thereon. This heat seal layer is formed of a material which is fusible with the heat to be used during the heat sealing of the opposed portions of the film for the formation of a sealed part. Examples of the material fulfilling the requirement include such olefin type resins as low-density polyethylene (high-pressure polyethylene and low-pressure straight-chain low-density polyethylene) and nonstretched polypropylene and polyethylene-vinyl acetate copolymer. Although the temperature for the heat sealing is variable with various factors such as the magnitude of pressure applied, the duration of pressure application, and the thickness and kind of the film used, it is generally selected in the range of 80° to 180° C., preferably 120° to 150° C. The material of the heat seal layer is desired to assume a completely molten state or at least a half-molten state at the temperature of the heat sealing described above. The heat seal layer may be formed of a single material which is capable of being heat-sealed as described above. It may be further provided with a layer of anchor coat agent to increase bond strength. Many isocyanate type anchor coat agents exhibit excellent properties.

The heat seal layer is desired to possess a smaller tensile strength than the substrate layer, and it is also desired to possess a greater tear strength than the substrate layer. The tear strength is determined according to the method of JIS P 8116 on a test sample which is notched.

Specifically, the materials for the substrate layer and the heat seal layer are desired to be selected so that the tensile strength of the heat seal layer material will be not more than ⅔ and not less than 1/20 of the tensile strength of the substrate layer material, and that the tear strength (JIS P 8116) of the heat seal layer material will be not less than 5 times and not more than 150 times that of the substrate layer material. Examples of determining the commercially available plastic films are shown below.

TABLE

| Material | Thickness | Tensile strength MD/TD JIS Z 1707 Kg/15 mm in width | Tear strength MD/TD JIS P 8116 Kg/15 mm in width |
| --- | --- | --- | --- |
| Biaxially stretched nylon film | 15 μm | 2.8/2.8 | 15/15 |
| Polyvinylidene chloride-coated biaxially stretched 6-nylon film | 17 μm | 2.8/2.8 | 15/15 |
| Biaxially stretched polyester film | 12 μm | 2.1/1.9 | 5/10 |
| Biaxially oriented polypropylene film | 20 μm | 3.3/7.2 | 15/10 |
| Cellophane | 22 μm | 3.5/1.9 | 10/10 |
| Polyvinyl chloride film | 30 μm | 2.5/2.7 | 30/60 |
| Low-density polyethylene film | 30 μm | 0.6/0.4 | 200/500 |
| Linear low-density polyethylene film | 50 μm | 1.8/1.4 | 400/900 |

The materials for the substrate layer and the heat seal layer selected described above are desired to be processed so that the thickness ratio of the substrate layer to the heat seal layer falls in the range of 5:1 to 1:10, it is more preferable when the substrate layer is 10 to 50 μm, the heat seal layer 10 to 100 μm, and the total film 20 to 150 μm, in thickness, so that the produced bag possesses an easy openability and a resistance to breakage in harmony. Namely, tearing is easily done starting from the through cuts formed in the substrate and an unexpected tearing and quick propagation can be curbed. Thus, a possible breakage in the bag during transportation and handling can be prevented.

When a film made of such a resin as polyester resin or polyamide resin which has a barrier property, strength, and heat-resisting property or a laminated film containing at least one layer of the aforementioned film is used as the substrate layer, a tightly sealed bag obtained is suitable for the production of packages of high quality. A film obtained by laminating an aluminum foil and a plastic layer or a film having a thin metal containing such as of aluminum deposited on a plastic film by vacuum deposition, sputtering, or ion plating is useful as a substrate layer excelling in barrier property. Further, a laminated film obtained by superposing a barrier layer such as of vinylidene chloride type resin on a plastic layer such as of polyester, polyamide, or polypropylene also constitutes itself a desirable substrate layer for the film of this invention.

For example, a laminated film is desired to be consisting of paper /$PE_1$/AC/PET/$PE_2$ (PET denotes a polyethylene terephthalate substrate layer, AC an anchor coat layer, $PE_2$ a polyethylene heat seal layer, and $PE_1$ a polyethylene adhesive layer), where the paper layer is superposed to be placed on the surface opposite from the heat seal layer, or consisting of PET/$PE_1$/paper/$PE_2$, so that the through slits are concealed with paper or become inconspicuous. Thus, the film comes to have a favorable appearance. The present invention forms a multiplicity of through slits substantially in the edges. The expression "substantially in the edges" denotes that the through slits may be formed in a slightly inner portion from and along the edges or in the edges.

Figure 3A:
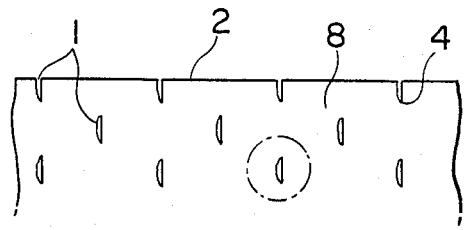
FIG. 3(a), (c), and (d) are plan views illustrating one end face of a film, (a) showing a state prior to sealing and, (c) a state after sealing, (d) a state after sealing with the through slits arranged differently, is and FIG. 3(b) an enlarged view of the through slit encircled with a dash and dotted line in (a).
Figure 3B:
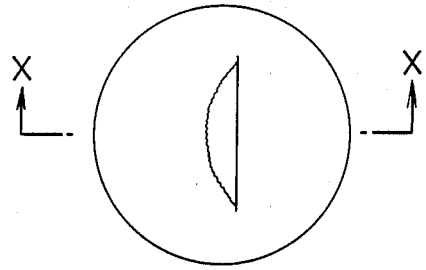
Figure 3C:
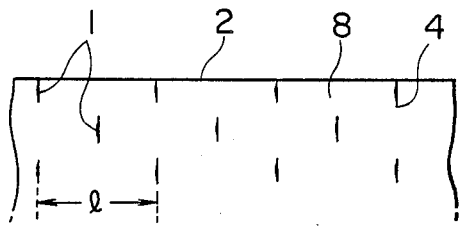
Figure 3D:
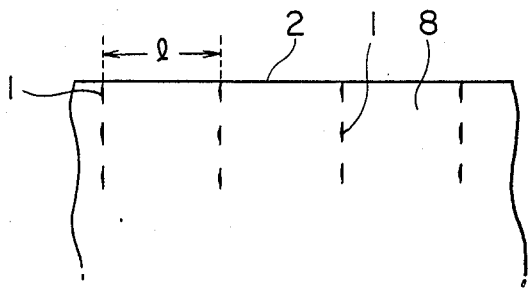

The through cuts or slits may be formed in zigzag pattern as illustrated in FIG. 3(c) or in series as illustrated in FIG. 3(d).

The through cuts or slits according to this invention do not denote completely opened through holes but denote the cuts left in the substrate layer after being formed through the substrate layer without producing the substrate layer scraps as shown in FIG. 2(a) and (b).

In the present invention, the through cuts or slits formed in the substrate layer are to be partly or wholly closed with the heat seal layer. The term "closed" denotes that:
(1) the heat seal layer material is filled into the through slits,
(2) the heat seal layer material penetrates into the through slits but does not fully fill them. The heat seal layer is heat-sealed around the through slits and closes their openings, and
(3) the heat seal layer does not penetrate into the through slits but is fused around them to cover and close their openings.

The expression "wholly closed with the heat seal layer" means that all the numbers of slits are closed with the heat seal layer in one or at least two ways of the above (1), (2), and (3).

The expression "partly closed with the heat seal layer" means that:
A. Some numbers of the whole slits are closed with the heat seal layer in one ar at least two ways of the above (1), (2), and (3), and
B. The heat seal layer material penetrates partly into the openings of the slits, or the openings are partly covered with the heat seal layer to narrow the opening area of the slits. But, the slits are not closed as in the above three ways (1), (2), and (3).

Figure 4:
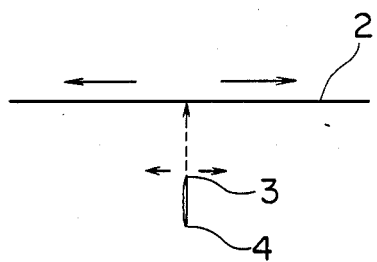
FIG. 4.
Figure 5:
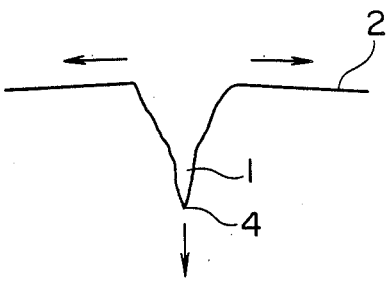
FIG. 5 are explanatory diagrams on the mechanism of tearing.

The through slits formed without producing film scraps by the present invention are in a slender shape having a length not exceeding 0.5 mm, preferably not exceeding 0.3 mm and exceeding 0.1 mm. As illustrated in FIG. 3, the through cuts 1 are disposed in a film 8 in a transversal direction relative to an edge line 2. Cracks (not illustrated in the drawing) start from the terminals 3, 4 of each through cut 1 shown in FIG. 4. Virtually no crack is seen to occur at any other point of the through cut. When a group of such through cuts is located substantially on the edge line, tears in the bag start from the inner terminals 4 of the through cuts 1. When such through cuts are located as separated inwards from the edge line 2, the stress exerted as indicated by the arrows in FIG. 4 causes tears to start from the edge line side terminals 3 of the through cuts toward the edge line 2 as indicated by the arrow of dotted line in FIG. 4. After the tears have reached the edge line, the tears begin to propagate in the transversal direction from the other terminals 4 of the through cuts as illustrated in FIG. 5.

The slender through cuts 1 substantially perpendicular to the edge line 2 are disposed ideally at 90° relative to the edge line. In actuality, the through cuts advantageously fulfil their part of this invention so long as they are disposed at angles falling in the range of 70° to 110°, preferably 75° to 105°.

The through cuts formed without producing film scraps means local injuries produced in the film as by causing the relevant portions of the film to be pulled outwardly or by inserting partial cuts in the portions, so that during the infliction of such injuries, absolutely no part is cut out from the film. The through cuts are formed in such portions of the film that are destined to form an edge portion when the opposed ends of the film are heat-sealed to complete a bag. When the film is thick and tough, these through cuts are required to be formed so as to border on the edge line. When the film is thin, they are desired to be located at a distance of 0.5 to 3 mm inwardly from the edge line.

Figure 2D:
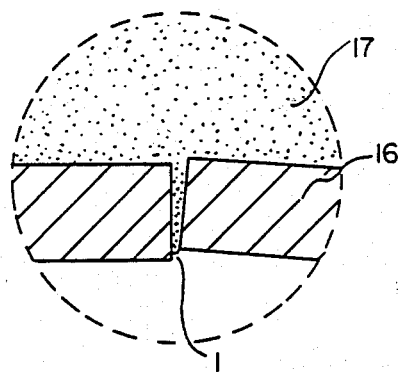
FIG. 2(d) is an enlarged view of the portion of the film within circle (d) in FIG. 2(a) and illustrates a through cut wholly filled by the heat seal layer material.

In accordance with this invention, when the film having the through cuts 1 formed in advance is folded and the opposed ends of the folded film are heat-sealed to form a sealed part of a bag as illustrated in FIG. 1, the molten heat seal layer 17 is allowed to enter the through cuts formed in the substrate layer 16 and substantially fill up the through cuts as illustrated in FIG. 2(a(d). In FIG. 2(a) and (b), 18 represents a through cut filled by the heat seal layer material. A through cut partially filled by the heat seal layer material is shown in FIG. 2(c) and a through cut wholly filled by the heat seal layer material is shown in FIG. 2(d). Since the through cuts are filled up in their fairly large portions, a possible decrease in the strength of the tightly sealed bag due to the presence of such through cuts can be represented to the minimum.

In the sealed part of the tightly sealed bag of this invention, the cuts may be distributed, so that those formed in one of the sealed substrate layers of film deviate from those formed in the other substrate layer as illustrated in FIG. 2(a) or they coincide with those formed in the other substrate layer as illustrated in FIG. 2(b). Where the material for the substrate layer of the film possesses notably high tear strength, the disposition of the through cuts in their mutually coinciding positions proves more desirable from the standpoint of easy opening of the bag. When the through cuts formed in one of the substrate layers coincide with those formed in the other substrate layer, easy openability of the bag is sufficiently attained even if the pitch 1 between the cuts is distant as shown in FIG. 3(c), (d). For example, the pitch 1 may be enlarged to about 5 mm. When the through cuts formed in one of the substrate layers do not coincide with those formed in the other substrate layer, it is preferably to fix the pitch 1 at not more than 1.5 mm, preferably in the range of about 1.0 to 1.5 mm from the standpoint of the easy opening property. The through cuts may be formed in a single row or in a plurality of rows of at least two. Where the through cuts are formed in a plurality of rows, the width of a group of cuts is desired to be not more than 5 mm, preferably not more than 3.5 mm.

Figure 6:
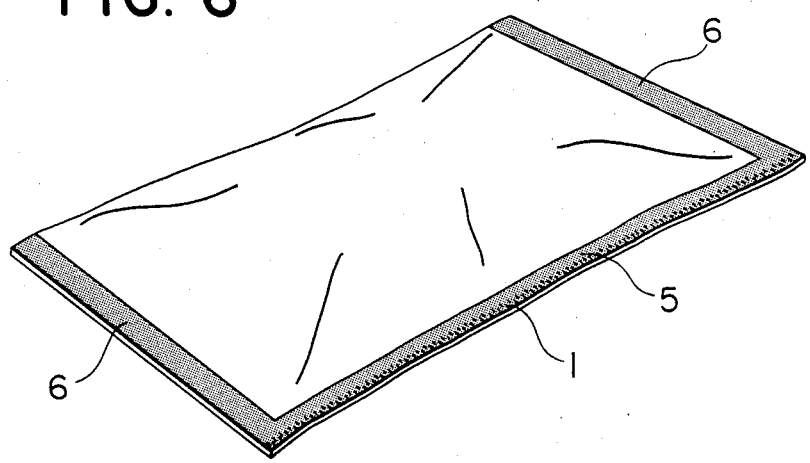
FIG. 6.
Figure 7:
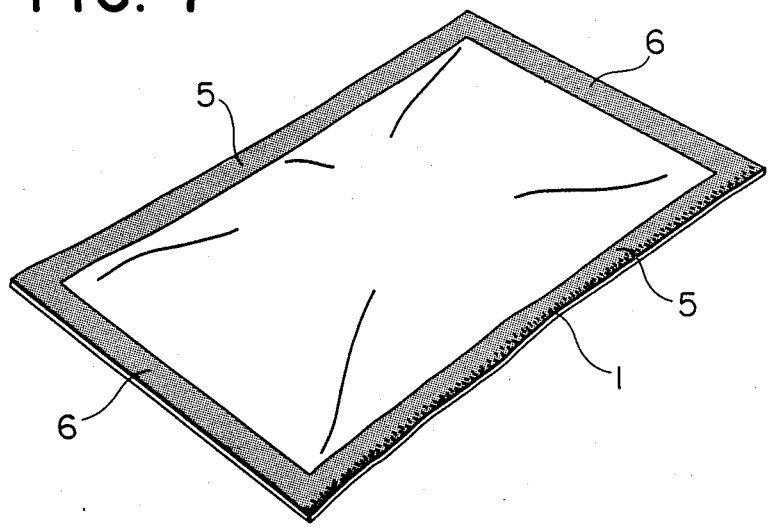
FIG. 7 are perspective views of tightly sealed bags.
Figure 8:
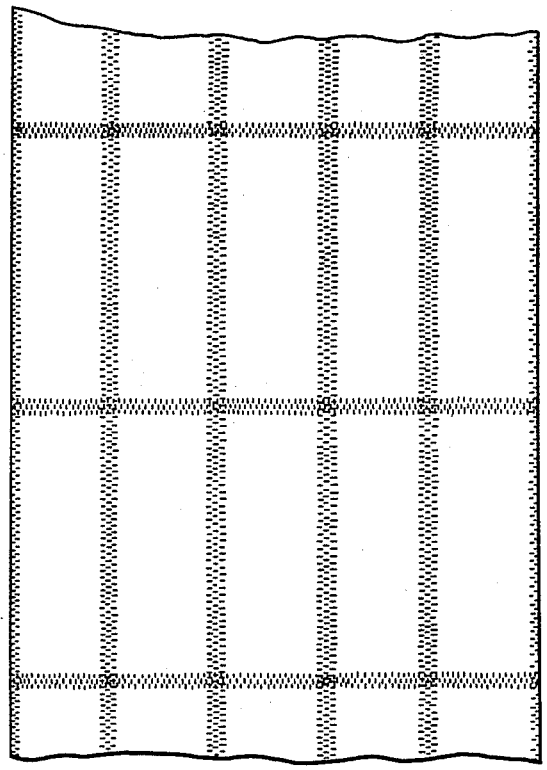
FIG. 8 is a plan view of a film processed for fabrication of bags.

As concerns the pattern of the tightly sealed bag produced by this invention, the bag may be sealed on three of the four sides as illustrated in FIG. 6 or sealed on all the four sides as illustrated in FIG. 7. In the diagrams, 5 stands for a heat-sealed portion in the longitudinal direction and 6 for a heat-sealed portion in the lateral direction. When the heat sealed portions 5 are formed on the outermost edges, the cuts are to be disposed in the outskirts of the sealed portions. FIG. 6 depicts a group of through cuts 1 formed on the edge lines and FIG. 7 a group of cuts 1 formed at a distance inwards from the edge lines. When part of the opposed ends of the folded film remain unsealed outside the sealed portion of the completed bag, the group of cuts is to be similarly formed in the edge portion of the unsealed part of the opposed ends of the folded film. In the film of this invention, the groups of through cuts are located locally or throughout the entire lengths of the opposite edge portions of the film in its unfolded state. When this invention is embodied in a mass-production system using an automatic bag-making and bag-filling machine adapted to cut a film in the longitudinal direction and, at the same time, produce at least two bags at a time, groups of through cuts are to be disposed each in several rows in the longitudinal direction. Where groups of through cuts 1 are disposed longitudinally and laterally after the pattern of a checkerboard as shown in FIG. 8, there can be obtained bags which are sealed on all the four sides and, therefore, are openable in any of the four directions.

Figure 9:
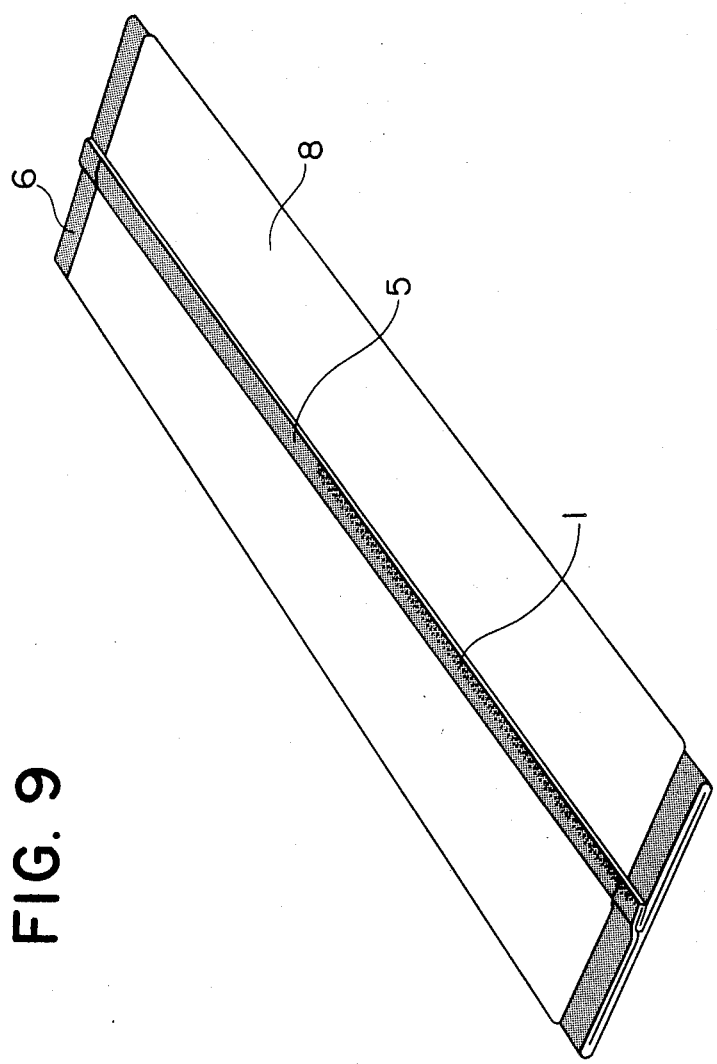
FIG. 9 is a perspective view of a tightly sealed bag.
Figure 10:
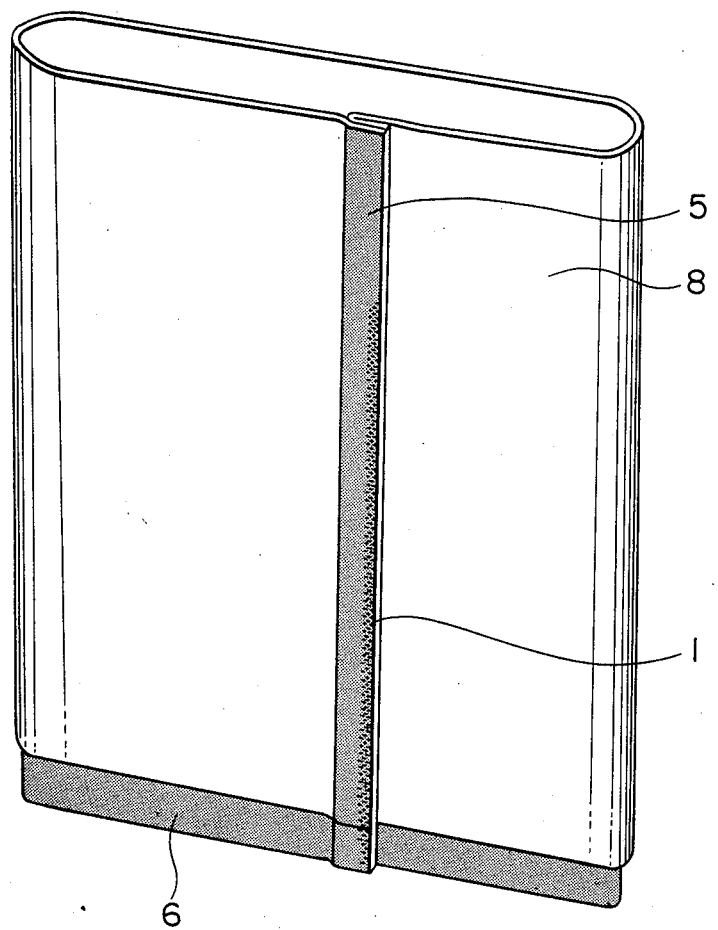
FIG. 10 is an enlarged transverse perspective view illustrating the tightly sealed bag of FIG. 9.

A bag having three sealed portions as illustrated in FIG. 9 can be also produced. FIG. 10 is a perspective view illustrating the bag of FIG. 9 in an enlarged transversely sectioned state. In this case, the opposite ends of the film 8 to be heat-sealed with each other are overlapped and then heat-sealed in the overlapping state. Thus, the heat-sealed portion does not protrude from the boundary of the bag surface. When the group of through cuts contemplated by this invention is formed in the outskirt of the longitudinally heat-sealed portion 5, the tear propagated is not stopped in the longitudinally fused portion but allowed to cross the entire width of the bag. Therefore, the contents in the shape of rigid bar or having a broad width close to that of the bag can be easily taken out of the bag.

The group of through cuts contemplated by this invention can be disposed throughout the entire length of the edge line. Optionally, they may be formed intermittently or locally as illustrated in FIG. 9.

Figure 12:
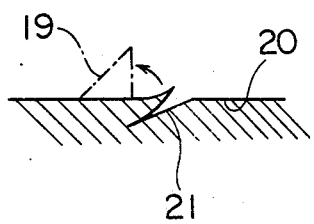
FIG. 12 is a cross section illustrating a typical process for the production of such a protrusion.
Figure 13:
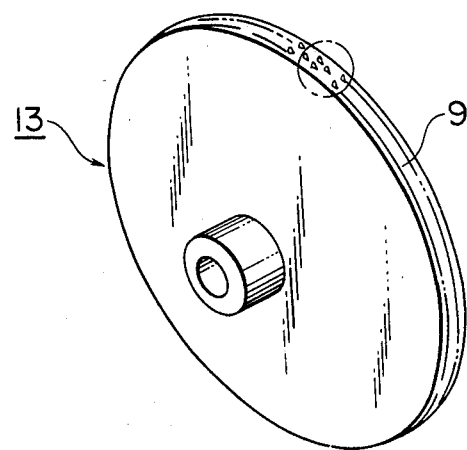
FIG. 13 is a perspective view of a fabricating wheel.
Figure 14:
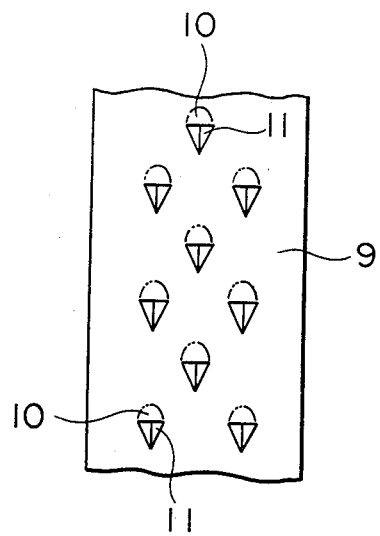
FIG. 14 is an enlarged plan view of part of the circumferential surface of the wheel of FIG. 13.

The tool to be used for forming such through cuts as described above is not specifically limited. A metallic roll having a multiplicity of slender cutting edges formed on the circumferential surface thereof or a metallic plate having the same cutting edges formed on the flat surface thereof can be advantageously used. For example, by making pseudotriangular cuts 21 in a metallic surface 9 and causing metallic portions separated from the metallic surface by the cuts to be raised relative to the bases of the pseudotriangles as axes as illustrated in FIG. 12, protrusions 10 are created and cut portions remain as depressions 11. The angle which the depression side surfaces of the protrusions 10, namely the bluff surfaces 12, form relative to the metallic surface is desired to exceed 60° and not to exceed 90°. The metallic material on which such protrusions as mentioned above have been arranged in at least one straight row is hardened and used as the tool. FIG. 13 is a perspective view of a processing roll 13 having such protrusions formed on the circumferential surface thereof and FIG. 14 is a plan view illustrating the portion of the processing roll 13 of FIG. 13 enclosed with a dash and dotted line in an enlarged state.

Figure 11:
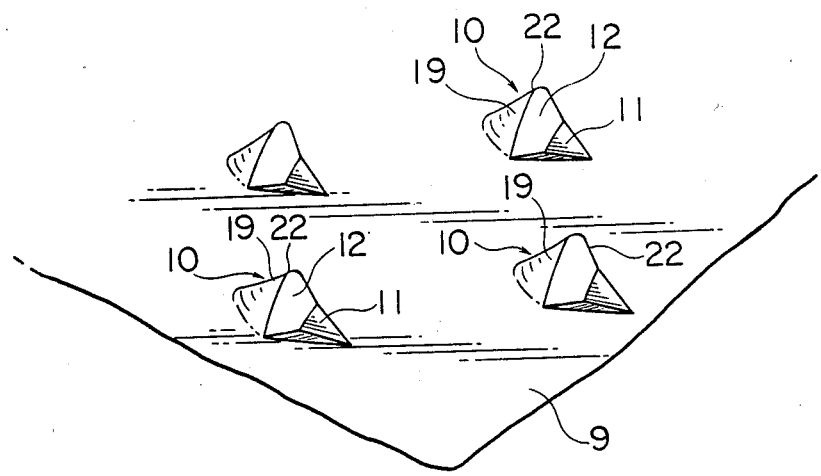
FIG. 11 is a diagram illustrating protrusions on a tool in a magnified state.

When the protrusions 10 illustrated in FIG. 11 are pressed against a film, the curved edges of the bluff surfaces 12 function as cutting edges, so that the edges of the bluff surfaces 12 will be straightly inserted into the portions of the film falling under the bluff surfaces 12 side and the outer sloped surfaces 19 will expand the portions of the film by the pressure exerted. As a result, the portions of the film which have admitted the insertion of the bluff surfaces 12 remain flat and the portions which have admitted the outer sloped surfaces 19 are deformed aslant downwardly and strained and come to differ from the level of the remaining portions of the film as illustrated in FIG. 1. The film is provided with the strained portions and the undeformed portions with the cuts therebetween. When the film is heat-sealed, the strained portions of the film are almost returned to their original state to coincide with the level of the remaining portions of the film, but they still possess the internal strain remained therein and, because of the internal strain, the strength of the film is lowered. Consequently, an important effect that the film is readily torn with the force of fingers from the bordering portion between the strained portion and the unstrained portion. Unlike the injuries inflicted by insertion of conventional cutting edges, cracks run from the opposite terminals of the through cuts produced as described above. These cracks are highly effective in starting tears in the film. When the through cuts shown in FIG. 1 and formed with the tool illustrated in FIG. 11 are heat-sealed, the portions deformed aslant downwardly are restored substantially to its original flat state as illustrated in FIG. 2(a), (b).

Figure 15:
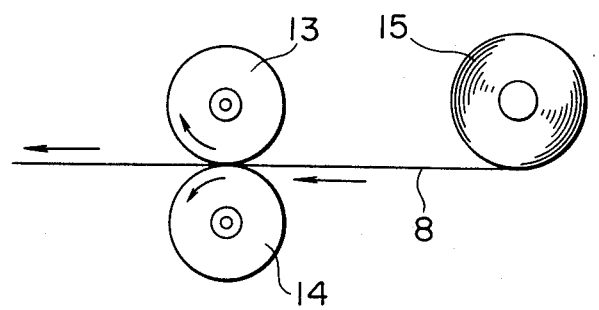
FIG. 15 is an explanatory diagram illustrating a typical fabrication performed on a film.

FIG. 15 is an explanatory diagram illustrating a typical setup for working on a film by the use of the processing roll illustrated in FIG. 13. The processing roll 13 and a retainer roll 14 are held in mutual contact and are rotated in opposite directions at one equal peripheral speed. The film 8 is passed through the two rolls. During the course of this passage, the film 8 is depressed by the protrusions 10 on the processing roll 13, with the result that through cuts 1 are disposed in the film in the pattern as illustrated in FIG. 3. In the diagram, 15 stands for a roll of film.

Figure 18:
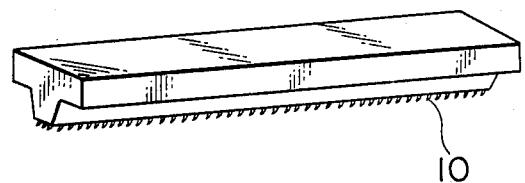
FIG. 18 is a perspective view illustrating a tool having protrusions formed on a flat bar.
Figure 19:
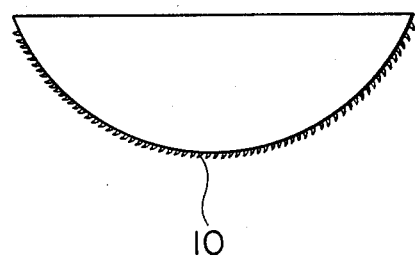
FIG. 19 is a perspective view illustrating a tool having protrusions formed on a plate cut out of a disk.
Figure 20:
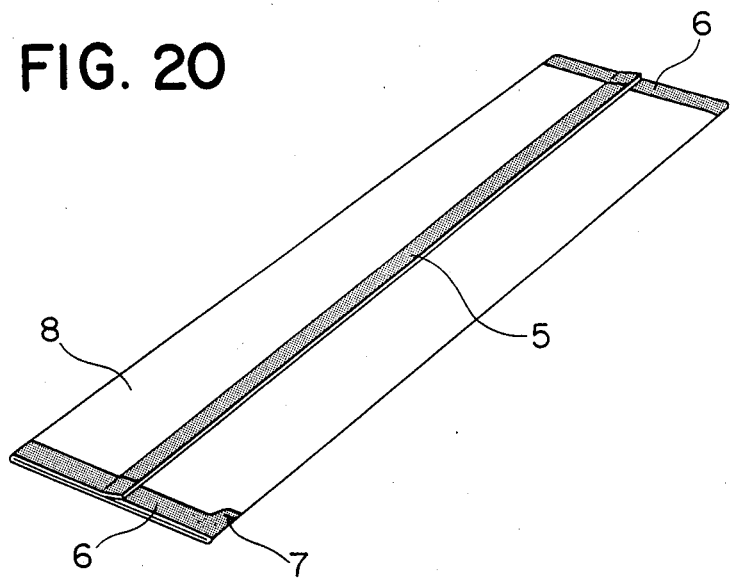
FIG. 20 is a perspective view illustrating one example of the conventional tightly sealed bags.
Figure 21:
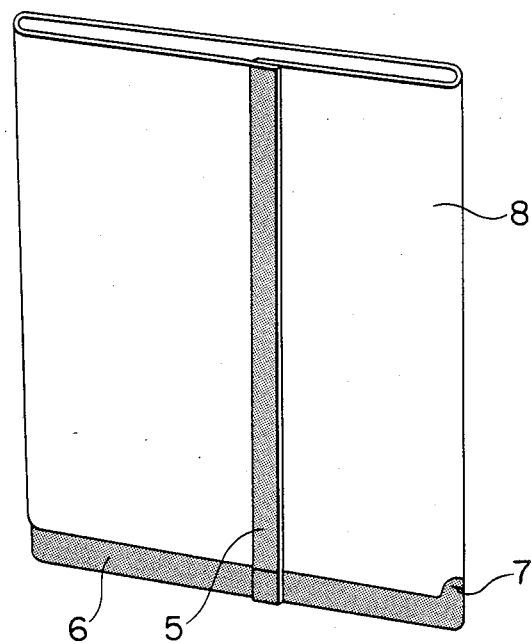
FIG. 21 is an enlarged transverse perspective view illustrating the sealed bag of FIG. 20.

In order to form the through cuts in the film, the tool may be used in the shape having protrusions 10 created on the surface of a flat bar as illustrated in FIG. 18 or in the shape having protrusions 10 created on a semicircular plate cut out from a disk as illustrated in FIG. 19.

The tool used in the present invention is desired to be made of a rigid material including a hardened steel and ceramics such as silicon carbide, titanium carbide, and silicon nitride. Where the tool shaped from a metallic material is covered with a thin coat of silicon carbide or titanium carbide, the obtained tool also exhibits outstanding wear-resistance and provides a sharp cutting for a long time.

Now, the methods available for the production of the easily openable tightly sealed bag of this invention will be described below.

These methods are roughly classified into the following two types: (1) The method which comprises inflicting through cuts in a film which has the substrate layer and the heat seal layer joined in advance by lamination and (2) the method which comprises first inflicting through cuts in the substrate layer and subsequently superposing the heat seal layer fast on one of the surfaces of the substrate layer. The procedure which follows the infliction of the through cuts, namely the procedure which comprises folding the film in such a manner that the portions bearing the aforementioned through cuts will be opposed to each other to form a portion or the entire portion of the sealed edge portions of a bag and heat-sealing the opposed edge portions or the inner sides thereof thereby giving rise to a tightly sealed bag, is applicable commonly to the two major methods (1), (2) mentioned above.

When the easily openable tightly sealed bag is produced by inflicting through cuts in the film by the above method (1), folding the film in such a manner that the portions bearing such through cuts will be superposed to form a portion or the entire portion of the sealed edge portions of a bag and heat-sealing the opposed edge portions thereby forming a sealed part in the completed bag, the through cuts are partly or wholly blocked with a heat seal layer as illustrated in FIG. 2(a) and (b) and they are distributed only in the heat-sealed portions. When the opposed edge portions are heat-sealed on their inner sides, the through cuts are distributed in the heat-sealed portions and in the nonheat-sealed portions falling outside the heat-sealed portions and the through cuts distributed in the heat-sealed portions are partly or wholly blocked with the heat seal layer and the through cuts distributed in the nonheat-sealed portions are not blocked with the heat seal layer.

When the easily openable tightly sealed bag is produced by inflicting through cuts in the substrate layer and superposing the heat seal layer thereon by the method of (2) and heat-sealing the opposed edge portions to form a sealed part in the completed bag, the through cuts are partly or wholly blocked with the heat seal layer and they are distributed only in the heat-sealed portions. In this case, when the inner sides of the edge portions are heat-sealed, the through cuts are distributed in the heat-sealed portions and in the nonheat-sealed portions alike and these through cuts in both the heat-sealed portions and the nonheat-sealed portions are partly or wholly blocked with the heat seal layer.

Example 1 [Manufacture of device for imparting through cuts]:

FIG. 11 is a perspective view of protrusions 10 on a through cut imparting device of this invention in a magnified state. As illustrated in FIG. 12, cuts 21 are made in a flat, smooth metallic surface 20. Then, the surface portions separated from the metallic surface in consequence of the work of making cuts 21 are raised substantially upright as indicated by the arrow of FIG. 12, and there are formed bluff surfaces 12 as illustrated in FIG. 11. The bluff surfaces 12 have on their backs formed outer sloped surfaces 19 by the flat, smooth metallic surface pulled up through the medium of ridge lines 22. By 11 are denoted depressions which are formed on the flat, smooth metallic surface by the insertion of the cuts. The angle which the bluff surfaces 12 form relative to the flat, smooth metallic surface 20 is required to exceed 60° and desired to fall in the range of 80° to 100°. The metallic material on which the protrusions of the shape described above are formed in a large number is hardened and used as a cutting blade of this invention.

Since the ridge lines 22 are formed by the cuts made in the metallic surface, they are naturally sharp and constitute excellent cutting edges. In the present working example, the protrusions 10 have a width of 0.4 mm at their feet. As illustrated in FIG. 13, these protrusions 10 are disposed in at least one row on the circumferential surface of a processing roll 13. FIG. 14 is a plan view illustrating the portion of the roll 13 indicated by a dash and dotted line in FIG. 13 in a magnified state. When this processing roll 13 is rotated and the protrusions 10 are brought into pressed contact with the film, the ridge lines 22 function as cutting edges to inflict a linearly arranged group of fine slender cuts in the film. Since the cutting edges are each in the form of a mountain, the length of the cuts inflicted in the film can be varied by regulating the pressure with which the cutting edges are pressed into the film. This device wears slowly and enjoys high durability because the cutting blades have an appreciable thickness.

Figure 16:
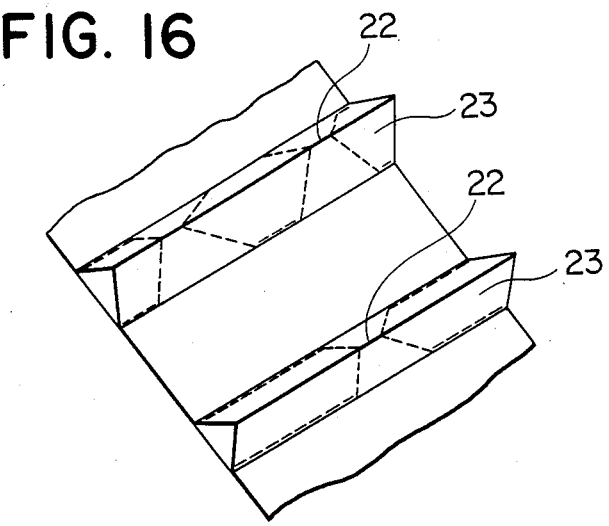
FIG. 16 is a perspective view illustrating another typical process for the production of a tool as another embodiment of the present invention.
Figure 17:
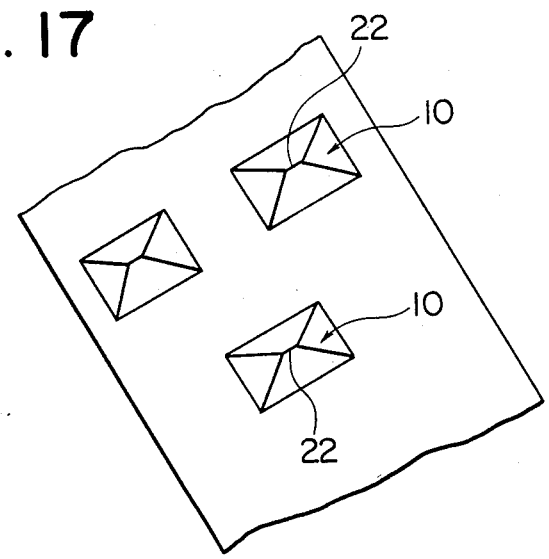
FIG. 17 is a perspective view of protrusions.

Example 2 [Manufacture of device]:

On the circumferential surface of a processing roll, a multiplicity of cutting blades 23 each having a triangular cross section and possessing a cutting edge running parallel to the axis are disposed as illustrated in FIG. 16. Then, by cutting out the portions incicated by the broken lines in FIG. 16, there are obtained protrusions 10 which retain part of the cutting edges 22 as illustrated in FIG. 17. The device so obtained yields substantially the same results as the device of Example 1.

Example 3 [Production of easily openable tightly sealed bag]:

A composite laminated film of 720 mm in width and 74 μm in total thickness consisting of the following structure was prepared by an extrusion laminating method:

$PET\#_{12}/AC/LDPE_{15}/Al_7/IR_{40}$ wherein,
$PET\#_{12}$: biaxially stretched polyester film (E-5100 produced by Toyobo K. K.): 12 μm in thickness
AC:imine type anchor coat agent (WS-680 produced by Matsumoto Seiyaku K. K.): 0.01 g/m² of solid content
$LDPE_{15}$: low-density polyethylene (Suntech LD, L-1850A produced by Asahi Kasei Kogyo K. K.): 15 μm in thickness
$Al_7$: flexible aluminum foil (produced by Tokai Kinzoku K. K.): 7 μm in thickness
$IR_{40}$: ionomer (Himiran 1652 SR, produced by Mitsui-Du Pont Polychemical K. K.): 40 μm in thickness A group of cuts was inflicted in the above laminated film with the device of Example 1.

As illustrated in FIG. 15, the processing roll 13 and the retainer roll 14 are held in mutual contact and are rotated in opposite directions at one equal peripheral speed. The film 8 is passed through the two rolls. During the course of this passage, the film 8 is pressed by the protrusions 10 of the processing roll 13. This film 8 is fed from the roll 15. Consequently, through cuts are formed in three rows, two at a distance of 10 mm from the opposite edges of the film 8 and one at the center of the width of the film. Then, by cutting the film along the central array of through cuts, there are obtained two strips of film each measuring 350 mm in width.

As illustrated in FIG. 1, the portions of the obtained film which were cut into with the bluff surfaces of the device remained flat and the portions which received the insertion of the outer sloped surfaces were deformed aslant downwardly, resulting in formation of the uneven film surfaces at the cut portions with the cuts therebetween. It was observed that the opposite terminals of each through cut were cracked.

From the obtained film pillow type gusset bags each having the three edge portions heat sealed and containing 250 g of instant coffee were produced by the use of an automatic bag making and bag-filling machine.

In the sealed part of each of the bags so produced by the automatic bag-making and bag-filling machine, the through cuts were wholly blocked with the heat seal layer. When the opposed edge portions are heat-sealed by the automatic bag-making and bag-filling machine, they are so positioned that the through cuts in one of the edge portions will deviate from those in the other edge portion.

During the course of the production of bags, the transportation of the produced bags, or the storage thereof, the film retained sufficient strength without suffering any trouble. The bags consequently obtained could be opened with the force of finger tips at any desired point in the longitudinal heat-sealed portions.

In this working example, the protrusions were arrayed orderly. The protrusions, if distributed irregularly, could be expected to bring about the effect aimed at by this invention so long as they were formed with sufficient density.

Example 4:

A composite laminated film of 770 mm in width and 70 μm in thickness consisting of the following structure was prepared by an extrusion laminating process:

$ON\#_{15}/AC/PE_{25}/EVA_{30}$ wherein,
$ON\#_{15}$: biaxially stretched 6-nylon film (Embrem produced by UNITIKA, Ltd.): 15 μm in thickness
AC:isocyanate type anchor coat agent (prepared by mixing EL-200 and CAT-200 both produced by Toyo Moton K. K. in the ratio of 13:1): 0.02 g/m² of solid content
$PE_{25}$:low-density polyethylene (Suntech LD, L-1850A produced by Asahi Kasei Kogyo K. K.): 25 μm in thickness
$EVA_{30}$: ethylene-vinyl acetate copolymer resin (Suntech EVA, EL-0990 produced by Asahi Kasei Kogyo K. K.): 30 μm in thickness The above isocyanate type anchor coat agent was applied to the biaxially stretched 6-nylon film by a gravure coating method. The low-density polyethylene layer and the ethylene-vinyl acetate copolymer resin layer were superposed to each other by a tandem extrusion laminating method.

A group of cuts was inflicted in the above laminated film with the device illustrated in FIG. 13 without giving rise to any waste scraps of the film.

The ethylene-vinyl acetate copolymer constituted the heat seal layer. On the circumferential surface of the processing roll 13, protrusions of the shape illustrated in FIG. 11 having the maximum width of 0.5 mm are arrayed in a total of four zigzag rows, two each at a center-to-center distance of 0.5 mm from the central zone of flat, smooth surface 1.5 mm in width left at the center of the width of the peripheral surface. Then, by following the procedure of Example 1, through cuts were inflicted in the portions at a distance of 10 mm from the opposite edges at an interval of 250 mm of width. Then, the film was cut in the centers of the arrayed groups of cuts to obtain the strips of film having a width of 250 mm and containing groups of through cuts in the portions at a distance of not less than 0.75 mm from the opposite edges of the film.

As illustrated in FIG. 1, the portions of the obtained film which were cut into with the bluff surfaces of the device remained flat and the portions which received the insertion of the outer sloped surfaces were deformed aslant downwardly, resulting in formation of the uneven film surfaces at the cut portions with the cuts therebetween. It was observed that the opposite terminals of each through cut were cracked.

Figure 22:
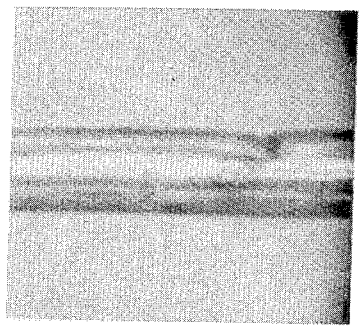
FIG. 22 is a micrograph showing a section of a cut in the sealed portion of the tightly sealed bag of the present invention.

From the film so obtained, pillow type bags each having the edge portions heat-sealed and containing 250 g of a piece of devil's-tongue jelly were produced by the use of an automatic bag-making and bag-filling machine. A micrograph illustrating the sealed portion containing cuts is shown in FIG. 22.

In each of the bags so produced by the automatic bag-making and bag-filling machine, the through cuts were partly blocked with the heat seal layer. During the heat sealing of the opposed edge portions with the automatic bag-making bag-filling machine, these edge portions were so positioned that the through cuts in one of the edge portions deviated from those in the other edge portion.

During the course of the production of bags, the transportation of the produced bags, or the storage thereof, the film retained sufficient strength without suffering any trouble. The bags consequently obtained could be opened with the force of finger tips at any desired point in the longitudinal heat-sealed portions.

Example 5:

A composite laminated film was prepared by following the procedure of Example 4 except that through cuts were inflicted in the biaxially stretched 6-nylon film with the device illustrated in FIG. 13 immediately prior to laminating in the process of extrusion lamination.

Then, by following the procedure of Example 4, the laminated film was cut at the center of the groups of cuts, to afford two strips of film having a width of 250 mm and containing through cuts in the portions at a distance of 0.75 mm inwardly from the oppositely edges of the film. The ethylene-vinyl acetate copolymer constituted the heat seal layer.

From the film so obtained, pillow type bags each having the edge portions heat-sealed and containing 250 g of a piece of devil's-tongue jelly were produced by the use of an automatic bag-making and bag-filling machine.

By visual inspection, the cuts in the tightly sealed bag produced by the automatic bag-making and bag-filling machine were found to be wholly blocked with the heat seal layer.

During the course of the production of bags, the transportation of the produced bags, or the storage thereof, the film retained sufficient strength without suffering any trouble. The bags consequently obtained could be opened with the force of finger tips at any desired position in the longitudinal heat-sealed portions.

Example 6:

A composite laminated film consisting of a stretched nylon film (15 μm in thickness) coated with vinylidene chloride resin as a substrate layer and a linear low-density polyethylene (25 μm in thickness) as a heat seal layer and measuring 820 mm in width and 40 μm in total thickness was used to produce vacuum-packed bags for domestic use with a bag-making machine capable of sealing three sides.

The laminated film used in this Example had the following structure in detail:

$KON\#_{15}$/adhesive/$L-LDPE_{25}$ wherein,
$KON\#_{15}$:polyvinylidene chloride-coated biaxially stretched 6-nylon (Hahden film, KN 8002 produced by Toyobo K. K.): 17 μm in thickness
Adhesive:isocyanate type adhesive (prepared by mixing AD-335AT and CAT-10 both produced by Toyo Moton K. K. in the ratio of 100:6): 2 μm in thickness (2-3 $g/m^2$ of solid content)
$L-LDPE_{25}$:linear low-density polyethylene (Tocello TUX-FC produced by Tokyo Cellophane K. K.): 25 μm in thickness The polyvinylidene chloride coat surface of the above polyvinylidene chloride coated biaxially stretched 6-nylon was coated with the isocyanate type adhesive by a gravure coater. The linear low-density polyethylene layer had its one surface subjected to corona discharge treatment. This treated surface was applied to the above adhesive-applied surface. Then, the above plies were subjected to a dry laminating method to produce a composite film.

In the process of forming the bags, the film taken out of the source of supply was folded in half and a group of through cuts was inflicted with the device illustrated in FIG. 13 in the portions which constitute the longitudinal sealed portions and the end portions of the bags to be made. Then, the film was heat-sealed to obtain the bags of 200 mm in width and 300 mm in length whose three end portions had been sealed.

Through cuts were formed in one end portion of the film folded into two (410 mm in width), in a portion at a distance of 200 mm inwards from the aforesaid end portion, and in a portion at a distance of 10 mm inwards from the other end portion. The remaining margin of 10 mm was cut off.

The bags thus produced had their two longitudinal end portions and one lateral end portion heat-sealed, and the top end was not sealed. The two longitudinal heat-sealed end portions contained a group of cuts in the width of about 2 mm to the whole longitudinal length of the bags. All the cuts had been covered with the heat seal layer.

During the course of the transportation of the produced bags, the storage thereof, or the handling in filling the bag in a house, the bag caused no trouble. The bag could be opened with the force of finger tips at any desired point in the longitudinal sealed portions.

What is claimed is:

1. An easily tearing openable tightly sealed plastic bag formed of a film containing at least a substrate layer and a heat seal layer, said bag having a sealed part which is comprised of at least two substrate layers held fast to an adjacent heat seal layer, so that the heat seal layer is disposed between the substrate layers forming a sealed edge line proximate to a border end of the substrate layers, which bag is characterized by said sealed part containing in the substrate layers thereof a multiplicity of through cuts, substantially formed over a major portion of the sealed edge line and disposed at angles in the range of 70° to 110° relative to the sealed edge line, at least a significant amount of said through cuts being wholly or partially filled by the heat seal layer in such a manner that the heat seal layer penetrates into the through cuts and closes said through cuts; the tensile strength of the heat seal layer being smaller than that of the substrate layer and the tear strength of the heat seal layer being greater than that of the substrate layer.

2. An easily openable tightly sealed plastic bag according to claim 1, wherein said through cuts are slender slits inserted substantially perpendicularly to the edges of said bag.

3. An easily openable tightly sealed plastic bag according to claim 2, wherein said through cuts formed in the substrate layer of one of two heat-sealed plies of film in said sealed part are deviated from those formed in the substrate layer of the other heat-sealed ply of film.

4. An easily openable tightly sealed plastic bag according to claim 2, wherein said through cuts formed in the substrate layer of one of two heat-sealed plies of film in said sealed part are superposed on those formed in the substrate layer of the other heat-sealed ply of film.

5. An easily openable tightly sealed plastic bag according to claim 2; wherein the tensile strength of the heat seal layer material is not more than $\frac{2}{3}$ and not less than 1/20 of the tensile strength of the substrate layer.

6. An easily openable tightly sealed plastic bag according to claim 1; wherein the tear strength of the heat sealed layer is not less than five times and not more than one hundred and fifty times that of the substrate material.

7. An easily openable tightly sealed plastic bag according to claim 1; wherein the thickness ratio of the substrate layer to the heat seal layer falls within the range of 5:1 to 1:10.

8. An easily openable tightly sealed plastic bag according to claim 2; wherein the thickness of the heat seal layer is 10 to 100 μm.

9. An easily openable tightly sealed plastic bag according to claim 1; wherein the thickness of the substrate layer is 10 to 50 μm.

* * * * *